Figure 1:
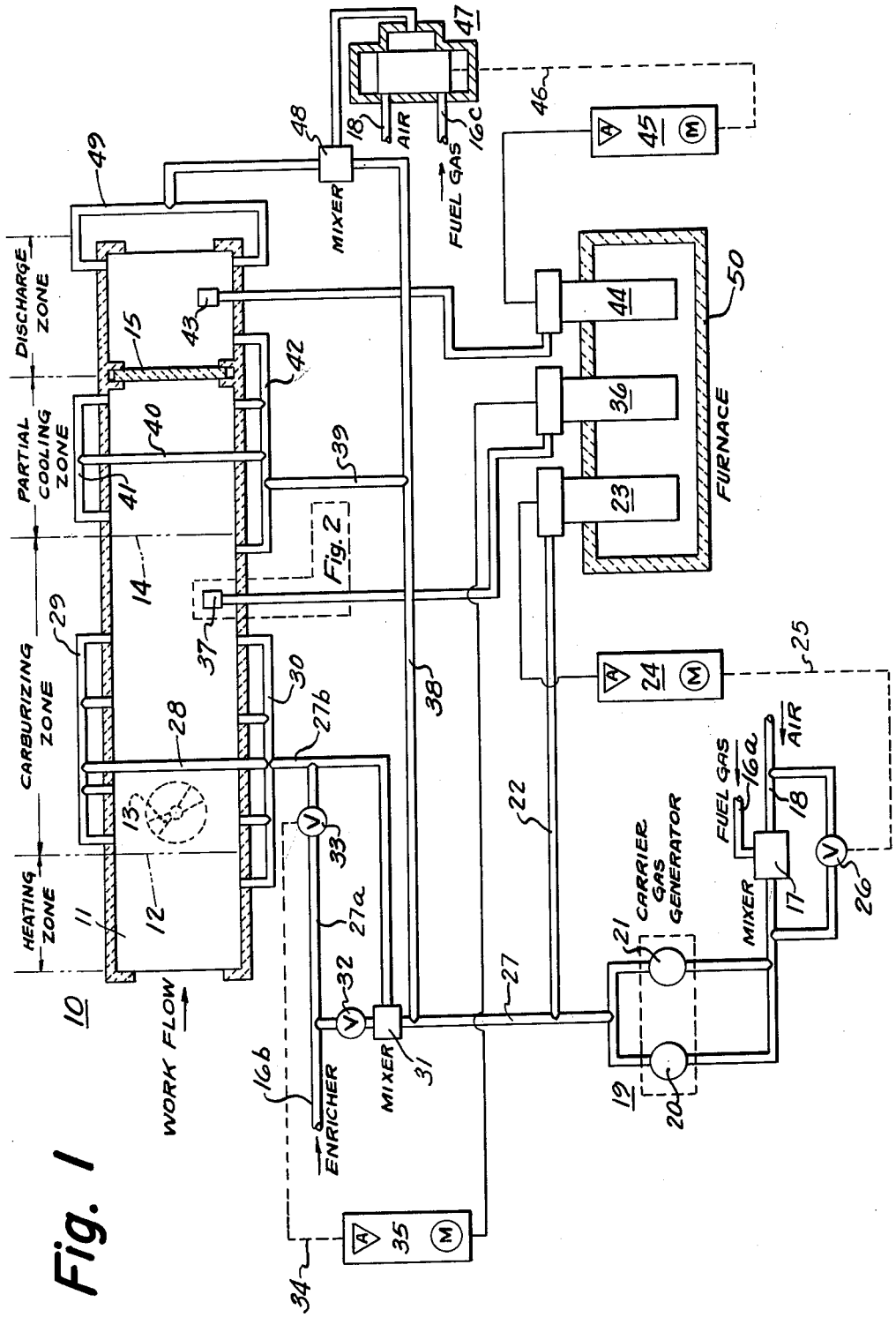

April 7, 1964 R. L. DAVIS II 3,128,323
MEASUREMENT AND CONTROL OF CONSTITUENT POTENTIALS
Filed July 11, 1960 2 Sheets-Sheet 1

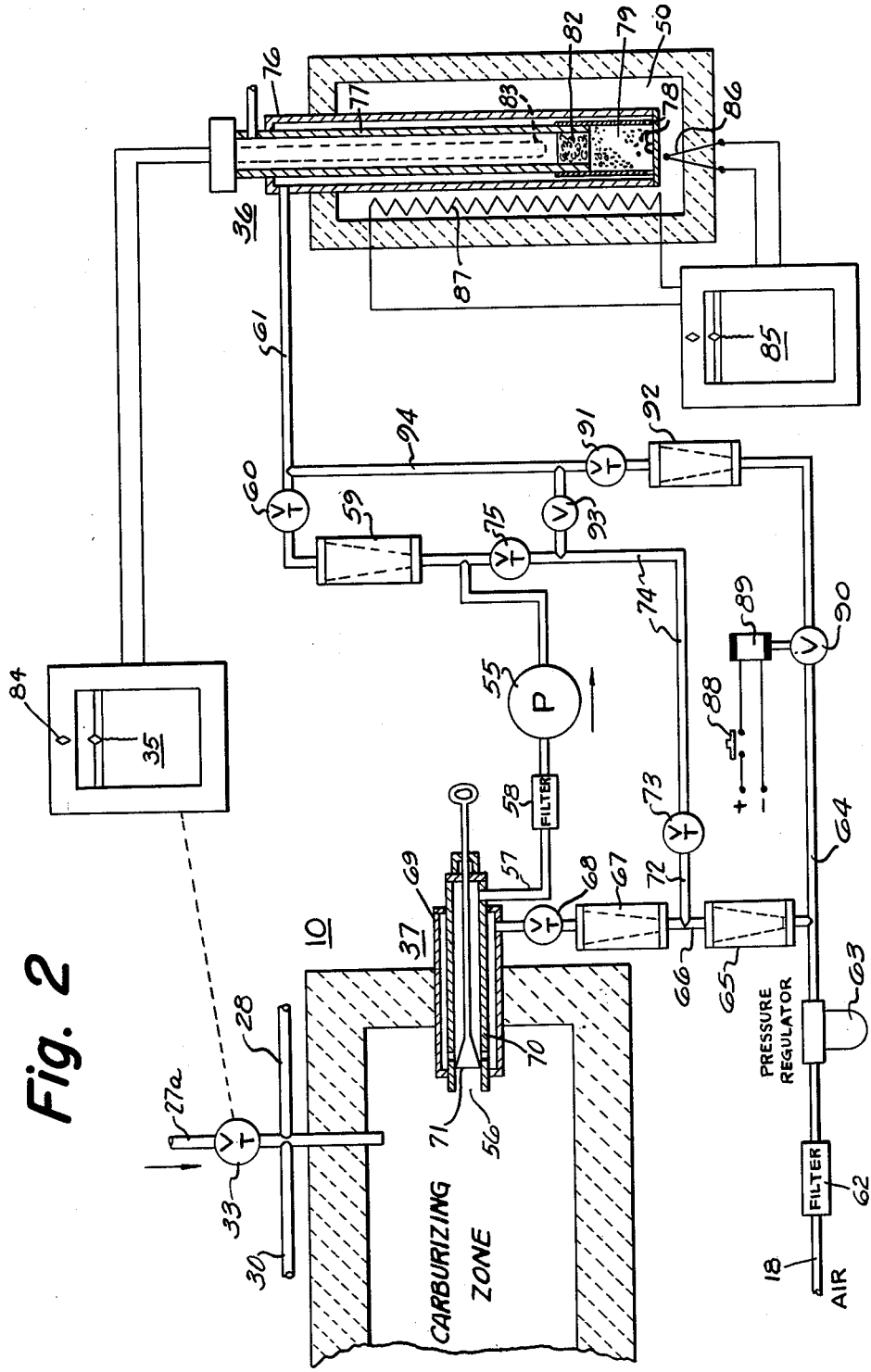

3,128,323
MEASUREMENT AND CONTROL OF
CONSTITUENT POTENTIALS
Raymond L. Davis II, Newtown Square, Pa., assignor to Leeds and Northrup Company, Philadelphia, Pa., a corporation of Pennsylvania
Filed July 11, 1960, Ser. No. 41,966
10 Claims. (Cl. 266—2)

This invention relates to methods of and apparatus for measuring and controlling the constituent potential of gaseous atmospheres and has for an object the provision of a method of and apparatus for determining the carbon potential of an atmosphere in which a sample stream thereof has a carbon potential beyond the range of the filamentary ferrous metal detecting element utilized in the system; that is beyond the range of stable equilibrium with ferrous metal at the temperature at which the system is maintained.

In my Patent 2,698,222 and in earlier U.S. Patent 2,541,857 there appear disclosures of methods and systems of controlling the constituent potentials of atmospheres utilized for nitriding and carburizing. In such systems there are utilized sensitive elements which preferably are made of a ferrous nickel alloy in which the nickel is present in an amount of about 5% with the remainder iron plus minor percentages of other materials. It has been found that with sensitive elements of the foregoing character there is a preferred range of operation in terms of the carbon potential to which such an element may be subjected. As explained in my aforesaid patents, the resistance of the sensitive element varies to a degree depending upon the amount of carbon taken up by or removed from that element. At a temperature of 1700° F., the resistance of such a detecting element for a carbon content of 0.2% may be 6.95 ohms, whereas at the same time for the same element the resistance will be about 7.21 ohms for a carbon content of 1.00%. In my Patent 2,698,222 I have set forth a method and apparatus for calibrating the measuring network by subjecting the element to a carbon-removing atmosphere involving CO, $CO_2$. In that patent I explained that as air is introduced into the region of the detecting element, the carbon dioxide increases and the carbon monoxide content decreases. This occurs by reason of the reaction between the carbon and oxygen to form carbon dioxide. Thus, in accordance with my aforesaid patents, a sensitive element is highly effective and provides for the measure of the carbon potential of a carburizing atmosphere between a lower limit of carbon content in the sensitive element and an upper limit. The upper limit of the carbon potential is determined by the capability of the sensitive element to receive carbon.

In the systems described in the above mentioned patents the carbon-receiving capability of the sensitive elements will be about 1.35% carbon. Accordingly, if the carbon potential of the atmosphere surrounding such an element shall be materially above about 1.35%, at say 1700° F., the operation will be above the carbon saturation range. Sooting can occur during such an operation and if sooting does occur, the resultant coating on the element will insulate or isolate the surface of that element from the carbon-containing atmosphere. In the case of massive pieces of work treated under such an atmosphere and fouled on the surface with soot there may be an actual loss of carbon from that surface from its saturation value of about 1.35% due to diffusion.

It is an object of the present invention to provide a method of and system for the measurement of carbon potentials present within a treating furnace in a range well above the saturation point of the sensitive element utilized, and above conditions of stable equilibrium in the furnace atmosphere in question.

It is a further object of the invention to utilize a sensitive element for the control of carbon potentials well in excess of the saturation point of the sensitive element utilized as a component part of the method of the system utilized for the control of the carbon potentials in the range above the saturation point of that element.

The present invention is particularly applicable to existing carburizing systems in which work progresses through a furnace having several zones, as for example, a heating zone, a carburizing zone, a partial cooling zone and a discharge zone. Within the carburizing zone of such systems it is sometimes necessary to raise the carbon potential far above the capability of the work to absorb carbon in order to maintain at the surface of such work a supply of carbon in a quantity needed to build up the carbon content in the work to a desired concentration and to the requisite depth and at a rate approaching that attainable in forced circulation batch type furnaces.

The conditions requiring the high carbon potentials arise as a result of the design of multiple zone systems of the foregoing character and they give rise to considerable difficulty in the control of the carbon potentials needed in such systems to produce a uniform selected carbon content at the surface of the work.

In accordance with the present invention the carbon-potential-producing components of a sample stream from the heat treating furnace having a carbon potential in excess of that to which the sensitive element will respond are reacted with potential-reducing gases of measured quantity to establish an atmosphere around the sensitive element having a carbon potential within its range of response and related to that of the higher range of carbon potentials which exist in the furnace from which the sample stream is derived. More specifically, there are added at a plurality of points in the sampling system carbon-potential-reducing materials each of which passes through accurate measuring apparatus in order to establish reproducible conditions by means of which the sensitive element may reproducibly control the admission of carburizing agents to the furnace to regulate the carbon potential within a range above that to which the sensitive element will respond.

Further in accordance with the present invention more precise control of the carbon content of work pieces processed in a multi-zone furnace is effected by control of one zone having a high carbon potential by reacting a sample of the atmosphere of that zone with a decarburizing medium for measurement of the carbon potential of that zone and control of the carbon potential of that zone by regulating the addition of carburizing agents for carbon enrichment of the atmosphere to that zone.

In addition means is provided for measuring the carbon potential of the atmosphere of a zone of relatively low carbon potential and controlling its carbon potential by regulating the addition of enriching material or decarburizing material of alteration of the carbon potential of the atmosphere in that zone.

For further objects and advantages of the invention and for a more detailed discussion of typical embodiments thereof, reference is to be had to the following detailed description taken in conjunction with the accompanying drawings, in which:

FIG. 1 schematically illustrates a metal treating system including a multi-zone furnace embodying the present invention;

FIG. 2 illustrates in greater detail operation of a system embodying the present invention.

Referring to FIG. 1, the invention in one form has been shown applied to a metal treating system of the multiple-zone type. More particularly, a furnace 10 of conventional construction includes a heating zone 11. Work to be treated is admitted to the heating zone through a door of the furnace and by suitable heating means, electrical or gas, the temperature of the work is raised to within the carburizing range, that is, from between about 1600° F. to 1700° F. Though no zone dividing doors are provided, the region to the left of the broken line 12 may be considered the heating zone. A circulating fan 13 is preferably mounted in the roof of the carburizing zone located to the right of the heating zone and to the left of a dotted line 14 which indicates the beginning of a partial cooling zone.

It is to be understood that the work porgresses through the furnace from left to right so that by the time it reaches the final discharge zone located to the right of the door 15, several hours will have elapsed.

When it is considered that bar stock will be treated in such furnaces it can readily be understood that the problem of maintaining uniform a carbon-carrying atmosphere throughout the elongated furnace is quite difficult. In some installations it has been found desirable to increase the carbon potential within the carburizing zone to relatively high values in order to impart to the work a carbon content within a desired range. The difficulty has been that there are numerous variables which change that carbon potential from time to time and therefore there has been lacking assurance in the final product, of a carbon content in the surface of the work of the desired value and throughout the desired depth. In order to overcome the uncertainties of such operations there are provided in accordance with the present invention a method of and system for controlling the carbon potential within the carburizing zone notwithstanding its range exceeds that of the sensitive element utilized for the measurement of a related carbon potential.

The carbon-imparting atmosphere within the carburizing zone is preferably produced in the following manner. Fuel in the form of natural gas, methane, or other hydrocarbon from a supply line 16a is in mixer 17 mixed with air from a supply line 18 and supplied to a carrier-gas generator 19. This generator 19 includes two retorts 20 and 21 for producing an end product comprising a gas including about 20% carbon monoxide, 40% hydrogen, and 40% nitrogen, in mixture with small percentages of carbon dioxide, water vapor, and traces of methane.

As is also disclosed and claimed in my copending application Serial No. 41,965, filed concurrently with this application, now U.S. Patent No. 3,084,999, there is shown in FIG. 1 a sample stream 22 drawn from the output line from the carrier-gas generator which stream is supplied to a sensitive element 23. This element 23 is connected to a measuring instrument 24 which functions through a mechanical connection 25 to open and close a valve 26 to regulate the admission of air to the carrier-gas generator to maintain substantially constant the carbon potential of the carrier gas being produced by the generator 19 and supplied to the furnace 10. Carrier gas is supplied from the gas generator 19 by way of gas lines 27 and 28 to manifolds 29 and 30 distributed lengthwise of the carburizing zone to assure substantial uniformity and distribution of the carrier gas throughout that zone. As shown this gas is also supplied to other zones of the furnace later to be described.

The line 27 includes a mixer 31 for introduction of a fluid such as natural gas from supply line 16b; which may be connected to line 16a, to enrich the carrier gas supplied from generator 19. The gas from supply line 16b increases the carbon content of the carrier gas (which itself provides high carbon potentials) to produce still higher carbon potentials at the operating temperature within the carburizing zone. The carbon potential of the carrier gas may be of the order of 1% as an upper limit. The enriching gas supplied through line 16b will elevate the carbon potential to higher values and will increase the available carbon present in the mixture. If the carbon content required at the surface of the work should be of the order of 1.2%, a valve 32 will be opened to introduce enriching fluid to the mixer 31 thus to increase the carbon potential within the carburizing zone to at least 1.2%. The carbon potential of the atmosphere within the carburizing zone will be further increased to a high value above about 1.35% by the operation of a control valve 33. This control valve is operated, i.e., opened by a mechanical or electrical means indicated by connection 34 under the control of a measuring instrument 35 responsive to a sensitive element 36 to which there is supplied from a sampling probe 37 a sample stream from the carburizing zone of furnace 10. For simplicity the details associated with the sampling probe 37 have been indicated by the broken line rectangle labeled "FIG. 2" in the system of FIG. 1. These details will be later presented as soon as the problem solved by the system of FIG. 2 has been further elaborated on in the discussion of FIG. 1. It will suffice here to say that the system of FIG. 2 modifies the sample of the gas as withdrawn by the probe 37 and reduces its carbon potential to a carbon potential within the range of reliable response of the sensitive element 36.

As the work moves through the partial cooling zone, a zone in which the heating is less intense and thus of lowered temperature, additional carrier gas is supplied by way of lines 38, 39, and 40 and associated headers 41 and 42. The added carrier gas in the partial cooling zone acts to modify the carbon potential of the atmosphere flowing into this zone from the carburizing zone. It is desired that the carbon potential within the discharge zone be of the same order as that desired for the surface of the work. In this connection it is to be understood that while the "partial cooling zone" and the "discharge zone" are both of lower temperatures, they are nevertheless heated zones and are maintained within a carburizing temperature range above about 1500° F. Transfer of carbon to and from the work can take place in both of the aforesaid zones at the indicated temperature.

There is withdrawn from the discharge zone by way of a sample probe 43 a sample stream which is supplied to a sensitive element 44 connected to a measuring instrument 45, that instrument through connection 46 operating a control valve 47 to regulate the supply of air or of fuel gas from supply lines 18 and 16c respectively to a mixer 48 for supplying to a header 49 the added gases such as air or enriched gas depending on the position of valve 47 to maintain within the discharge zone a carbon potential corresponding with the carbon content desired in the surface of the work. If the gases within the discharge zone are too rich in carbon, the control functions through valve 47 to add air to the carrier gas for reduction of the carbon potential in the discharge zone. The air is admitted by way of line 18 and valve 47.

The valve 47 has been illustrated as a slide valve which when operated by the instrument 45 either opens the port from the fuel gas line 16c or the port from the air supply line 18 to meet the aforesaid requirements.

The instruments 24, 35 and 45 are of the type having an amplifier for the control of the energization of a motor. Such amplifier-motor instruments are well known in the art and may be of the type disclosed in Williams Patent 2,113,164.

It is to be noted that the sensitive elements 23, 36, and 44 are respectively mounted in a separate or auxiliary furnace 50, the temperature of which is maintained within the carburizing range and preferably a temperature corresponding with that of the discharge zone of the work furnace. Conventional heat regulating means are preferably provided for the auxiliary furnace 50.

Summarizing the foregoing, the system in accordance with the present invention maintains under control the composition of the carrier gas, the carbon potential within the carburizing zone though in a range above that of the sensitive element 36, and to a more precise degree regulates the carbon potential within the discharge zone to assure the work shall have a predetermined carbon content upon completion of its passage through the treating apparatus.

It has above been pointed out that the carbon potential in the carburizing zone is maintained at a high level, beyond the sensing range of the detector element. This is necessary not only because of the need to transfer large amounts of carbon to the work in order to increase the carbon content of the surface of the work and to a substantial depth by the desired amount, generally of the order of 1% and within the usual times selected for passage of the work through a carburizing zone, but also to offset the influx of large amounts of decarburizing material such as air which may leak into the furnace and failure to achieve good equilibrium conditions within the furnace due to loss of adequate circulation. In order to measure the carbon potential of atmospheres having a high carbon potential the system disclosed in FIG. 2 is utilized.

As shown in FIG. 2, the probe assembly 37 extends into the carburizing zone and through the operation of a pump 55 a sample of the atmosphere within the carburizing zone is withdrawn by way of the entrance portion 56. The sample stream flows by way of a line 57 through a filter 58, through the pump 55, a flow meter 59 and by way of a regulating valve 60 to the constituent-measuring assembly 36. In order to reduce the carbon potential of the sample stream as it is delivered by way of pipe 61 to the assembly 36, it is necessary to add to that stream, gases which will react with the carbon compounds to decrease their effectiveness as carburizing agents. It is preferred that the aforesaid gases be added in the following manner. From an air supply line 18 atmospheric air under pressure passes through a filter 62, a pressure regulator 63, into a line 64. The air under uniform pressure flows by way of a flow meter 65 to a branch line 66. A part of the stream flows by way of a second flow meter 67 under the control of a valve 68 into the space between an outer tubular member 69 and an inner tubular member 70 forming a part of the sampling probe 37. It will be noted that the air flows inwardly toward the inlet 56 of probe 37 where it is discharged radially into the inlet region to mix with the sample stream withdrawn by way of line 57. The mixing is promoted by reason of the constriction provided near the radial openings by a longitudinally slidable cleaning element 71, one of the ends of which has a generally conical shape, with the large end disposed toward the opening 56, the diameter of the large end of the cone being less than that of opening 56. Due to the heat of the atmosphere flowing into the mouth of the probe the air will react with the sample.

Experience has shown that the amount of air which may be admitted into the sampling probe 37 is limited by the composition and rate of flow and must be below a rate of flow which will produce condensation in the sampling line 57. The diluent in the form of air added within the probe 37 will lie within the range of about 1% to about 2% by volume of the sample stream withdrawn from the carburizing zone.

It is to be understood that the composition of the sample stream will be high in carbon monoxide and high in hydrogen, and also high in methane. It will be further remembered that the presence of the methane increases the carbon potential within the carburizing zone to well above 1%. The addition of air within the probe 37 is selectively reactive with the methane, and thus the oxygen combines with methane to form water vapor and carbon dioxide. Insufficient air to reduce the carbon potential from a high value to below about 1.3 will be added to the sample in the sample probe because of the formation of water vapor and the resultant tendency for condensation to occur. Accordingly, additional air is introduced by way of line 72, a valve 73, line 74, valve 75 and through the flow meter 59 to the constituent-determining assembly 36. The stream enters the assembly 36 in the space between the outer tubular member 76 and an inner tubular member 77. As the mixture flows downwardly within the furnace 50 its temperature is elevated at least to about 1550° F. During the passage downwardly the oxygen of the air preferentially reacts with any methane remaining in the sample and any excess oxygen present produces carbon dioxide and water vapor.

In order to assure a reasonable degree of completion for all reactions, the mixture through a plurality of openings 78 enters a catalyst chamber 79 filled with a suitable catalyst which may comprise nickel impregnated Alundum preferably in granular form. The catalyst assures the completion of all reactions for delivery of the resultant sample stream of gases to a flow passage filled with a reducing agent 82.

As disclosed and claimed in my copending application Serial No. 41,965, the reducing agent is preferably a metallic wool inert to carbon. Preferably, it comprises manganin wool. The term "wool" is defined for the purposes of this application as including metal cloth, thus the manganin wool may take the form of No. 36 wire flattened and woven into a fabric, which fabric is then rolled and pressed into the flow channel in the region between the catalyst material 79 and the sensitive element 83.

As for the manganin itself, any of the commercial grades of that alloy will be suitable. As indicated above, all alloys will be suitable if inert to carbon, that is, alloys which do not absorb carbon. Manganin and similar alloys are preferred because of the presence of manganese, a material which is active in forming oxygen compounds. Where copper and copper alloys are utilized, the amount of wool utilized will be increased because of the decreased activity in respect to oxygen particularly when the affinity for oxygen is less than that of manganin. The gases prior to entry into the flow passage containing the reducing agent 82 now comprise carbon monoxide, hydrogen and nitrogen, with methane, water vapor and carbon dioxide present in minor proportions. There is thus produced about the sensitive element 83, in the form of a filamentary ferrous metal, an atmosphere having a carbon potential related to that of the carburizing zone but having a carbon potential of a much lower order.

Experience will dictate the setting of a control point setter 84 of the instrument 35 for the control of the valve 33 for admission to the carburizing zone of the carburizing agent in the form of natural gas or other hydrocarbon from supply line 16b, FIG. 1, and line 27a in order to maintain at a selected value the carbon potential within the carburizing zone. Stated differently, the response of the element 83 to a carbon potential within a lower range will be effective in controlling the carbon content within the carburizing zone within a range of a higher order.

The modification of FIG. 2 may be used alone for control of some furnaces; however, when multi-zone control as described in FIG. 1 is employed, close control of the atmosphere in the carburizing zone may not be required. Inasmuch as the purpose of the carburizing zone is to transfer large quantities of carbon at the operating temperatures and within the available time intervals, it is not essential to the operation that there be precision of control. On the other hand, it is important that the carbon potential be maintained reasonably constant and corrected for loss of carbon potential due to opening of doors, ingress of air, change of temperature, and other variables encountered in the normal operation of metal treating furnaces of the type under discussion.

For these objectives a minimum amount of operating experience is all that is needed to establish the relationship between the response of the element 83 and the control of the valve 33 by the instrument 35. Where increased precision is desired, it will be desirable to utilize test samples within the carburizing zone of the same material as that of the work and to check the carbon content after the expiration of a time interval corresponding with the time the work remains in the carburizing zone to establish the relationship between the response of the element 83 and the operation of the valve 33. Reference may be had to Patent 2,541,857 for the manner in which such test materials have been utilized in establishing the relationship between carbon potentials and carbon content in the surface of materials.

It will be noted that the furnace 50 in FIG. 2 is provided with a temperature control including an instrument 85 which responds to a thermocouple 86 for regulating the energization of a heating coil 87 to maintain constant at a selected temperature the furnace 50.

From time to time it may be desirable to calibrate the sensitive element 83. For this purpose it is only necessary to close the calibrating switch 88 to energize a solenoid 89 to open a valve 90. Under the control of a valve 91, air is admitted by way of flow meter 92 to the lines 94 and 61 to transform the atmosphere about the element 83 to one of a carbon-removing character. During the initial period of the order of 5 to 10 minutes, the instrument 35 will show a gradual reduction in carbon content to a reproducible minimum. When that value has been attained and maintained for three to four minutes, the instrument 35 can then be adjusted if recalibration be desired for continued operation of the system with a greater assurance of accuracy of response than before the calibrating operation.

In the description of the system of FIG. 2 thus far presented it has been tacitly assumed that a valve 93 has been closed and that all of the air added for reduction of the carbon potential of the sample of furnace atmosphere for the purpose of measuring has been added to the sample stream by way of the flow meter 59. In some cases it will be desirable to eliminate the flow of air added through line 74 by way of the flow meter 59. This flow meter will then respond solely to the sample stream plus the air added in the sampling probe, the latter amount of air being indicated by the reading of flow meter 67. For this arrangement, the valve 75 will then be closed and the valve 93 opened and valve 73 adjusted until the reading of the flow meter 65 less the reading of flow meter 67 indicates that there will be flowing through valve 93 and line 94 to line 61 the desired quantity of air to assure the needed reduction in the carbon potential of the atmosphere surrounding the element 83.

What is claimed is:

1. A system for measuring the carbon potential of a carburizing atmosphere, comprising
    means providing a fluid circuit including an inlet adapted to be disposed in said carburizing atmosphere, a mixing chamber, a filament chamber, and an outlet passage,
    means in said fluid circuit for moving a sample stream of the atmosphere in said carburizing zone serially through said inlet and thence through said mixing and filament chambers,
    a sensitive element including a ferrous metal filament supported in said filament chamber, the electrical resistance of said element varying in accordance with change in carbon content thereof, the carbon potential of said atmosphere being normally above the range within which said element will reliably respond,
    an electrical measuring circuit connected to said element for producing a signal varying in accordance with the electrical resistance of said element,
    supply means for supplying to said sample stream prior to its arrival in said filament chamber a second gaseous stream to form with said sample stream a third stream of gases for flow through said filament chamber, said second gaseous stream including at least one gas of character which when mixed with said sample stream reduces the carbon potential of that stream to within said range within which said element will reliably respond, and
    flow-responsive means disposed for the measurement of the rates of flow of at least two of said streams of gases for indication of the relative rates of flow of said sample stream and of said second stream of gases.

2. In a system for measuring the carbon potential of a carburizing atmosphere, means providing a fluid circuit including an inlet adapted to be disposed in said carburizing atmosphere, a mixing chamber, a filament chamber, and an outlet passage; means in said fluid circuit for moving a sample stream of the atmosphere in said carburizing zone serially through said inlet and thence through said mixing and filament chambers; a sensitive element including a ferrous metal filament supported in said filament chamber, the electrical resistance of said element varying in accordance with change in carbon content thereof, the carbon potential of the atmosphere being normally in excess of the response capabilities of said element; an electrical measuring circuit connected to said element for producing a signal varying in accordance to the electrical resistance of said element; supply means including a supply conduit for supplying to said sample stream in the mixing chamber gases including oxygen, said gases being of a character which react with the carburizing constituents of said sample stream to reduce the carbon potential of said stream within the range of capability of response of said element; flow-responsive means in said supply conduit for measuring the rate of flow of said gases to said mixing chamber; flow-responsive means in said fluid circuit for measuring the rate of flow of said sample stream through said filament chamber; and a reducing agent in said fluid circuit between the mixing chamber and the filament chamber for reducing the oxidation potential of the mixture of said oxygen-including gases with the sample stream to protect said sensitive element against oxidation from the resultant mixture of gases.

3. The combination with a detecting element of ferrous metal having an electrical characteristic which varies with change in carbon content thereof, and means for surrounding said element with a carburizing atmosphere the carbon potential of which is to be measured, of sampling means for withdrawing from a carburizing zone of a carburizing furnace a sample stream of the carburizing atmosphere, that atmosphere being characterized by a carbon potential in excess of that at which the sensitive element will reliably respond, supply means for supplying to said sampling means gases which react with the carburizing constituents of said sample stream to reduce the carbon potential thereof by an amount to bring that potential within the range at which said detecting element will be reliably responsive, means connected to said detecting element responsive to change from a selected carbon potential of a carburizing agent to said furnace to maintain said carbon potential at said selected value, flow-responsive means disposed between said supply means and said sampling means for measuring the rate of flow of said gases to said sample stream, whereby said control means may establish reproducible carbon potentials within said furnace under the control of said detecting element while said carbon potentials are above the range to which said detecting element is reliably responsive, said sampling means including a probe having an inner flow channel for the sample stream and an outer flow channel, means for supplying a part of said gases into said outer flow channel for mixture with the sample stream within said inner flow channel, means for subsequently adding the remaining part of said gases to said sample stream after reduction of its temperature, and flow-responsive means responsive to the flow of said sample stream from said furnace after mixture with both parts of said stream of gases.

4. The combination with a detecting element of ferrous metal having an electrical characteristic which varies with change in carbon content thereof, and means for surrounding said element with a carburizing atmosphere the carbon potential of which is to be measured, of sampling means for withdrawing from a carburizing zone of a carburizing furnace a sample stream of the carburizing atmosphere, that atmosphere being characterized by a carbon potential in exces of that at which the sensitive element will respond, supply means for supplying to said sampling means gases of a character which react with the carburizing constituents of said sample stream to reduce the carbon potential thereof by an amount to bring that potential within the range at which said detecting element will be reliably responsive, means responsive to change from a selected carbon potential of said atmosphere within said furnace for varying the supply of a carburizing agent to said furnace to maintain said carbon potential at said selected value, flow-responsive means disposed between said supply means and said sampling means for measuring the rate of flow of said gases to said sample stream whereby said control means may establish reproducible carbon potentials within said furnace under the control of said detecting element while said carbon potentials are above the range to which said detecting element is reliably responsive, said first named means including an elongated tubular member having a flow channel for said sampling stream, said element being disposed within said tubular member, heating means for said tubular member, and means including a catalyst disposed in said flow channel for promotion of the reactions between the carburizing agents of said sample stream and said gases to complete the reduction of said carbon potential prior to the production of a resultant atmosphere from said mixture in the vicinity of said detecting element.

5. The combination of claim 4 in which said flow channel includes a reducing agent for reducing the oxidation potential of the mixture of gases after passage through said catalytic material to protect said detecting element against oxidation from the resultant mixture of said gases.

6. The combination with a detecting element of ferrous metal having an electrical characteristic which varies with change in carbon content thereof, and means for surrounding said element with a carburizing atmosphere the carbon potential of which is to be measured, of sampling means for withdrawing from a carburizing zone of a carburizing furnace a sample stream of the carburizing atmosphere, that atmosphere being characterized by a carbon potential in excess of that at which the sensitive element will reliably respond, supply means for supplying to said sampling means gases comprising those contained in the air atmosphere which react with the carburizing constituents of said sample stream to reduce the carbon potential thereof by an amount to bring that potential within the range at which said detecting element will be reliably responsive, means connected to said detecting element responsive to change from a selected carbon potential of a carburizing agent to said furnace to maintain said carbon potential at said selected value, flow-responsive means disposed between said supply means and said sampling means for measuring the rate of flow of said gases to said sample stream, whereby said control means may establish reproducible carbon potentials within said furnace under the control of said detecting element while said carbon potentials are above the range to which said detecting element is responsive, said sampling means including a probe of double-wall construction having an inner flow channel for the sample stream and an outer flow channel, means for supplying a part of said gases into said outer flow channel for mixture with the sample stream within said inner flow channel, means for subsequently adding the remaining part of said gases to said sample stream after reduction of its temperature, and flow-responsive means responsive to the flow of said sample stream from said furnace after mixture with both parts of said stream of gases.

7. The combination of claim 6 in which said first named means includes an elongated tubular member, having a flow channel for said sampling stream, said element being disposed within said tubular member, heating means for said tubular member, and means including a catalyst disposed in said flow channel for promotion of the reactions between the carburizing agents of said sample stream and the oxygen compounds of said air-atmosphere to complete the reduction of said carbon potential prior to the production of a resultant atmosphere from said mixture in the vicinity of said detecting element.

8. The combination of claim 7 in which said flow channel includes a reducing agent for reducing the oxidation potential of the mixture of gases after passage through said catalytic material to protect said detecting element against oxidation from the resultant mixture of said gases.

9. The combination with a metal treating furnace having a plurality of metal treating zones in which differing carbon potentials are to be maintained, a plurality of sample probes respectively disposed in certain ones of said zones each sample probe having an intake, a ferrous metal detecting element for each of said probes, an enclosure for each detecting element, and means defining fluid conduits respectively connecting the intakes of the probes to the enclosure for the detecting elements therefor for producing respectively around each of said detecting elements an atmosphere related to the sample stream withdrawn through said respective probes, one of said carburizing zones having a carburizing potential above the range at which its corresponding detecting element will reliably respond, of means for introducing into the sample stream from said high level carburizing zone at a point in the fluid conduit therefor between the probe intake and the detecting element enclosure therefor gases including oxygen for reaction with the carburizing agents of said sample stream to reduce the carbon potential thereof to within the range at which its associated detecting element will respond, means for concurrently heating said several detecting elements and their enclosures to corresponding temperatures, and means connected to each of said detector means for regulating the flow of carburizing agent to said respective zones to maintain in them said carbon potentials of differing magnitude.

10. The combination of claim 9 in which there is provided for said plurality of zones a carrier gas generator, flow connections for dividing the flow of carrier gas from said generator to said several zones into separate streams, and means under the control of said sensitive elements for adding a carburizing agent to said separate streams of carrier gas under the control of said detecting elements whereby in one of said zones there occurs massive transfers of carbon to said work and in at least the last of the remaining zones there is maintained a lower carbon potential to establish with precision a predetermined quantity of carbon at the surface of the work.

References Cited in the file of this patent

UNITED STATES PATENTS

| | | |
|---|---|---|
| 2,573,649 | Nier | Oct. 30, 1951 |
| 2,698,222 | Davis | Dec. 28, 1954 |